(12) United States Patent
Gurney et al.

(10) Patent No.: US 10,695,986 B2
(45) Date of Patent: *Jun. 30, 2020

(54) METHOD FOR FORMING A STRUCTURAL PANEL

(71) Applicant: Rohr, Inc., Chula Vista, CA (US)

(72) Inventors: Andrew S. Gurney, San Diego, CA (US); Raymond R. Listak, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 319 days.

This patent is subject to a terminal disclaimer.

(21) Appl. No.: 15/682,914

(22) Filed: Aug. 22, 2017

(65) Prior Publication Data

US 2019/0061276 A1 Feb. 28, 2019

(51) Int. Cl.

| | | |
|---|---|---|
| *B29C 65/70* | (2006.01) | |
| *G10K 11/172* | (2006.01) | |
| *B32B 3/12* | (2006.01) | |
| *F02C 7/045* | (2006.01) | |
| *B29C 51/08* | (2006.01) | |
| *B29C 51/26* | (2006.01) | |
| *F02K 1/82* | (2006.01) | |
| *B29L 31/30* | (2006.01) | |

(Continued)

(52) U.S. Cl.
CPC ............ *B29C 65/70* (2013.01); *B29C 51/082* (2013.01); *B29C 51/266* (2013.01); *B32B 3/12* (2013.01); *F02C 7/045* (2013.01); *F02K 1/827* (2013.01); *G10K 11/172* (2013.01); *B29L 2031/3076* (2013.01); *B32B 3/266* (2013.01); *B32B 3/28* (2013.01); *B32B 2307/102* (2013.01); *B32B 2605/18* (2013.01); *F02C 7/24* (2013.01); *F05D 2250/61* (2013.01); *F05D 2260/96* (2013.01); *F05D 2260/963* (2013.01); *F05D 2300/43* (2013.01)

(58) Field of Classification Search
CPC ................... B64D 29/00; B64D 33/02; B64D 2033/0206; B64D 33/06; B64C 1/40; B32B 3/28; B32B 2605/18
See application file for complete search history.

(56) References Cited

U.S. PATENT DOCUMENTS

| | | |
|---|---|---|
| 3,380,206 A | 4/1968 | Barnett |
| 3,542,152 A | 11/1970 | Adamson et al. |

(Continued)

FOREIGN PATENT DOCUMENTS

| | | |
|---|---|---|
| CN | 104723616 | 6/2015 |
| FR | 2201010 | 4/1974 |

(Continued)

OTHER PUBLICATIONS

EPO Search Report dated Jan. 9, 2019 for Application No. 18188783.7.

*Primary Examiner* — Alison L Hindenlang
*Assistant Examiner* — Debjani Roy
(74) *Attorney, Agent, or Firm* — Getz Balich LLC (57) ABSTRACT

A method is provided for forming a structural panel. During this method, a core structure is formed by shaping a first portion of a sheet of ribbon material to form a first baffle and a first septum. Thermoplastic material is then overmolded onto the ribbon material, between the first baffle and the first septum, to form a first set of walls.

20 Claims, 10 Drawing Sheets

(51) Int. Cl.
   *B32B 3/26* (2006.01)
   *B32B 3/28* (2006.01)
   *F02C 7/24* (2006.01)

(56) References Cited

U.S. PATENT DOCUMENTS

| | | | |
|---|---|---|---|
| 3,639,106 A | 2/1972 | Yate | |
| 3,734,234 A * | 5/1973 | Wirt | E04B 1/86 |
| | | | 181/286 |
| 3,821,999 A | 7/1974 | Guess et al. | |
| 3,850,261 A | 11/1974 | Hehmann et al. | |
| 3,910,374 A | 10/1975 | Holehouse | |
| 3,948,346 A | 4/1976 | Schindler | |
| 4,189,027 A | 2/1980 | Dean, III et al. | |
| 4,240,519 A | 12/1980 | Wynosky | |
| 5,498,462 A | 3/1996 | Darfler | |
| 5,923,003 A | 7/1999 | Arcas et al. | |
| 5,997,985 A | 12/1999 | Clarke et al. | |
| 6,245,407 B1 | 6/2001 | Wang et al. | |
| 6,598,701 B1 | 7/2003 | Wood et al. | |
| 6,871,725 B2 | 3/2005 | Johnson | |
| 7,124,856 B2 | 10/2006 | Kempton et al. | |
| 7,784,283 B2 | 8/2010 | Yu et al. | |
| 7,814,658 B2 | 10/2010 | Akishev et al. | |
| 7,878,229 B2 | 2/2011 | Nakajima et al. | |
| 7,959,109 B2 | 6/2011 | Dasilva et al. | |
| 7,963,362 B2 | 6/2011 | Lidoine | |
| 7,971,684 B2 | 7/2011 | Gantie et al. | |
| 8,025,122 B2 | 9/2011 | Giloreest et al. | |
| 8,245,815 B2 | 8/2012 | Valleroy et al. | |
| 8,336,316 B2 | 12/2012 | Kirby | |
| 8,413,922 B2 | 4/2013 | Porte et al. | |
| 8,449,707 B2 | 5/2013 | Simmons et al. | |
| 8,544,598 B2 | 10/2013 | Gaudry et al. | |
| 8,646,574 B2 | 2/2014 | Drevon et al. | |
| 8,684,301 B2 | 4/2014 | Porte et al. | |
| 8,733,501 B2 | 5/2014 | Porte et al. | |
| 8,763,751 B2 | 7/2014 | Starobinski et al. | |
| 8,776,946 B2 | 7/2014 | Todorovic | |
| 8,820,477 B1 | 9/2014 | Herrera et al. | |
| 8,955,643 B2 | 2/2015 | Liu | |
| 9,643,392 B2 | 5/2017 | Butler et al. | |
| 9,704,467 B1 * | 7/2017 | Nampy | G10K 11/172 |
| 2011/0100747 A1 | 5/2011 | Hoetzeldt et al. | |
| 2011/0254196 A1 | 10/2011 | Vauchel et al. | |
| 2012/0121853 A1 | 5/2012 | Mendola | |
| 2013/0266772 A1 | 10/2013 | Fujii | |
| 2014/0034416 A1 * | 2/2014 | Liu | F02C 7/045 |
| | | | 181/290 |
| 2014/0349082 A1 | 11/2014 | Tien | |
| 2015/0284945 A1 | 10/2015 | Tien | |
| 2015/0367953 A1 * | 12/2015 | Yu | B64D 33/06 |
| | | | 181/222 |
| 2017/0144361 A1 | 5/2017 | Hills et al. | |
| 2017/0225764 A1 | 8/2017 | Nampy et al. | |
| 2018/0229829 A1 * | 8/2018 | Pierick | B64C 1/40 |

FOREIGN PATENT DOCUMENTS

| | | |
|---|---|---|
| GB | 1406844 | 9/1975 |
| RU | 2413654 | 6/2010 |

* cited by examiner

METHOD FOR FORMING A STRUCTURAL PANEL

BACKGROUND OF THE DISCLOSURE

1. Technical Field

This disclosure relates generally to a structural panel and, more particularly, to forming a structural panel for use in, for example, an aircraft nacelle.

2. Background Information

Structural acoustic panels may be used in various applications to attenuate noise. An acoustic panel, for example, may be configured for a nacelle of an aircraft propulsion system to attenuate noise generated by a gas turbine engine. Such an acoustic panel typically includes a cellular core connected between a perforated face skin and a solid, non-perforated back skin. The cellular core includes a plurality of resonating chambers. These resonating chambers may be tuned to target a specific frequency of noise to be attenuated by adjusting, among other factors, the chamber length, determined by the core depth.

Recent trends in aircraft engine design such as higher bypass ratios, larger fan diameters, slower rotating fans and/or fewer number of fan blades have resulted in those aircraft engines generating relatively low frequency noise. Relatively strict space constraints for those engines, however, typically limit or prohibit increasing the thickness of an acoustic panel to tune its resonating chambers for relatively low frequency noise. To accommodate these parameters, the assignee of the present patent application is developing an N-core style acoustic panel, see U.S. Patent Publication No. US 2015/0367953 A1. The core structure in an N-core style acoustic panel is difficult to manufacture. The present disclosure includes methods by which such a core might be manufactured. However, the methods disclosed herein are not limited to forming the particular core shape shown herein or in the '953 publication.

SUMMARY OF THE DISCLOSURE

According to an aspect of the present disclosure, a method is provided for forming a structural panel. During this method, a core structure is formed. The core structure includes a corrugated ribbon, a plurality of walls and a plurality of cavities. The corrugated ribbon includes a plurality of baffles and a plurality of septums. Each of the cavities extends laterally between a respective adjacent pair of the walls. Each of the cavities extends longitudinally between a respective adjacent pair of the baffles. Each of the cavities is longitudinally divided into a pair of sub-cavities by a respective one of the septums. During the forming, a first portion of a sheet of ribbon material is shaped to form a first of the baffles and a first of the septums. Thermoplastic material is overmolded onto the ribbon material, between the first of the baffles and the first of the septums, to form a first set of the walls.

According to another aspect of the present disclosure, another method is provided for forming a structural panel that includes a first skin, a second skin and a core structure. The core structure includes a plurality of baffles, a plurality of septums, a plurality of walls and a plurality of cavities. Each of the cavities extends laterally between a respective adjacent pair of the walls. Each of the cavities extends longitudinally between a respective adjacent pair of the baffles. Each of the cavities extends vertically from the first skin to the second skin. Each of the cavities is longitudinally divided into a pair of sub-cavities by a respective one of the septums. During the method, a substantially flat sheet of ribbon material is provided. A portion of the sheet of the ribbon material is shaped at a first location to form a respective one of the baffles and a respective one of the septums. The portion of the sheet of the ribbon material is shifted from the first location to a second location. Thermoplastic material is overmolded onto the ribbon material to form a respective set of the walls in a channel defined between the respective one of the baffles and the respective one of the septums. The shaping, the shifting and the overmolding is repeated one or more times for one or more other portions of the sheet of the ribbon material to at least partially form the core structure. The first skin is attached to the core structure. The second skin is attached to the core structure.

The shaping may include folding and/or stamping the portion of the sheet of the ribbon material to form the first of the baffles and the first of the septums.

The forming of the core structure may further include: shaping a second portion of the sheet of the ribbon material to form a second of the baffles and a second of the septums after the forming of the first set of the walls; and overmolding thermoplastic material onto the ribbon material, between the second of the baffles and the second of the septums, to form a second set of the walls.

The forming of the core structure may further include: forming a second of the baffles; and overmolding thermoplastic material onto the ribbon material, between the second of the baffles and the first of the septums, to form a second set of the walls.

The forming of the core structure may further include: shaping a second portion of the sheet of the ribbon material to form a second of the baffles and a second of the septums before the forming of the first set of the walls; and overmolding thermoplastic material onto the ribbon material, between the second of the baffles and the second of the septums, to form a second set of the walls.

The shaping of the first portion of the sheet of the ribbon of material may include stamping the first portion of the sheet of the ribbon material to form the first of the baffles and the first of the septums.

The shaping of the first portion of the sheet of the ribbon of material may include folding the first portion of the sheet of the ribbon material to form the first of the baffles and the first of the septums.

The ribbon material may be or otherwise include thermoplastic material.

The method may also include forming one or more perforations in the first portion of the sheet of the ribbon material before the shaping. The one or more perforations may be configured in the first of the septums.

The method may also include foliating one or more perforations in the first of the septums after the shaping and before the overmolding.

The method may also include forming one or more perforations in the first of the septums after the overmolding.

The shaping may be performed at a first location. The overmolding may be performed at a second location.

The shaping and the overmolding may be performed at a common location.

The forming of the core structure may also include forming one or more slits in the ribbon material. The one or more slits may be operable to enable flexibility of the core structure about a longitudinally extending axis.

A curvature of the core structure may be at least partially provided during the shaping.

A curvature of the core structure may be provided after the overmolding.

The forming of the core structure may also include shaping a second portion of the sheet of the ribbon material to form a second of the baffles and a second of the septums. The shaping of the second portion may be different from (or the same as) the shaping of the first portion.

The method may also include: bonding the core structure to a first skin; and bonding the core structure to a second skin. Each of the cavities may extend vertically between the first skin and the second skin. Each of the septums may be configured with one or more perforations, and the first skin may be configured with a plurality of perforations.

Each of the baffles and each of the septums may extend vertically between and/or may be connected to the first skin and the second skin. Each of the septums may extend longitudinally between and/or may be connected to a respective adjacent pair of the baffles.

The foregoing features and the operation of the invention will become more apparent in light of the following description and the accompanying drawings.

DETAILED DESCRIPTION OF THE INVENTION

The present disclosure includes methods for forming a structural panel using thermoplastic material. An example of such a structural panel 20 is schematically shown in FIG. 1.

Figure 1:
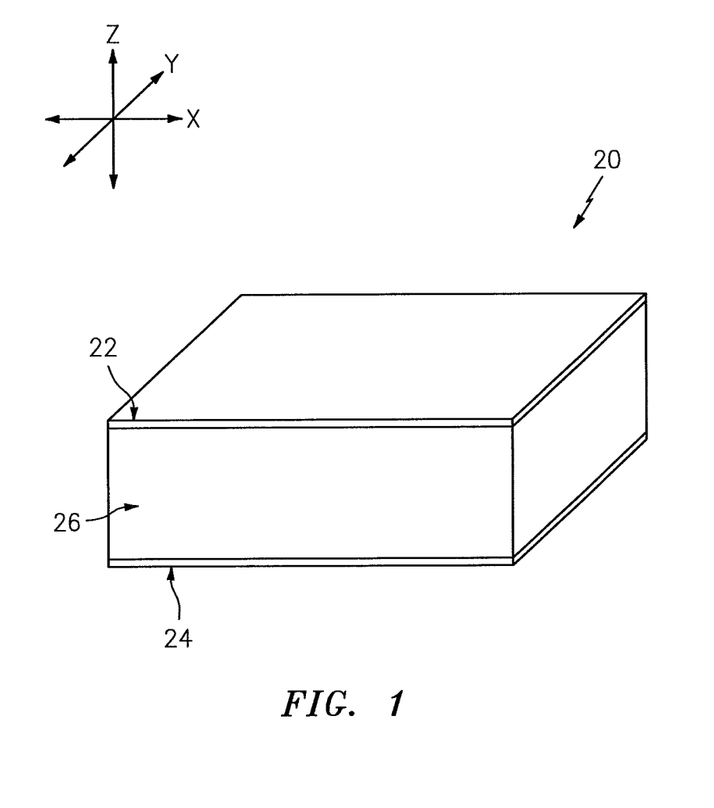
FIG. 1 is a schematic perspective illustration of an acoustic structural panel.

The structural panel 20 of FIG. 1 is configured as an acoustic panel; e.g., a sound attenuating panel. The structural panel 20, for example, may be configured to attenuate noise generated by an aircraft propulsion system such as, for example, a turbofan propulsion system or a turbojet propulsion system. With such a configuration, the structural panel 20 may be configured to form part of a nacelle of the propulsion system. The structural panel 20, for example, may be configured as or with an inner or outer barrel, a translating sleeve, a blocker door, etc. Alternatively, the structural panel 20 may be configured with another component/structure of the aircraft such as its fuselage or a wing. Furthermore, the structural panel 20 may be configured to also or alternatively attenuate aircraft related noise other than that generated by the propulsion system. The structural panel 20 of the present disclosure, however, may alternatively be configured for non-aircraft applications and/or non-sound suppression applications.

The structural panel 20 of FIG. 1 extends longitudinally along an x-axis. The structural panel 20 extends laterally along a y-axis. The structural panel 20 extends vertically along a z-axis. Note, the term "vertical" is used herein to describe a depthwise panel direction and is not limited to a gravitational up/down direction. Furthermore, for ease of illustration, the x-y plane is shown as a generally flat plane of FIG. 1. However, in other embodiments, the x-y plane and, thus, the structural panel 20 may be curved and/or follow an undulating geometry; e.g., complex 3D curvature. For example, the x-y plane and, thus, the structural panel 20 may be arcuate, cylindrical, conical, or tapered with or without radial undulations. In such embodiments, a solely vertical direction (e.g., z-axis) is defined relative to a position of interest on the x-y plane. For example, on a spherical x-y plane, the vertical direction (e.g., z-axis) is a radial direction.

The structural panel 20 includes a porous first skin 22, a solid non-porous second skin 24 and a cellular core structure 26. Note, the term "porous" is used herein to describe a body with perforations and/or open cell pores that enable flow of gas through the body. The term "non-porous" is used herein to describe a body with a configuration that prevents flow of gas through the body; e.g., a body without perforations or open cell pores.

Briefly, the core structure 26 is disposed and extends vertically between the first skin 22 and the second skin 24. The core structure 26 is also connected to the first skin 22 and the second skin 24. The core structure 26, for example, may be welded, brazed, fused, adhered or otherwise bonded to the first skin 22 and/or the second skin 24. The core structure 26 may also or alternatively be mechanically fastened to the first skin 22 and/or the second skin 24.

Figure 2:
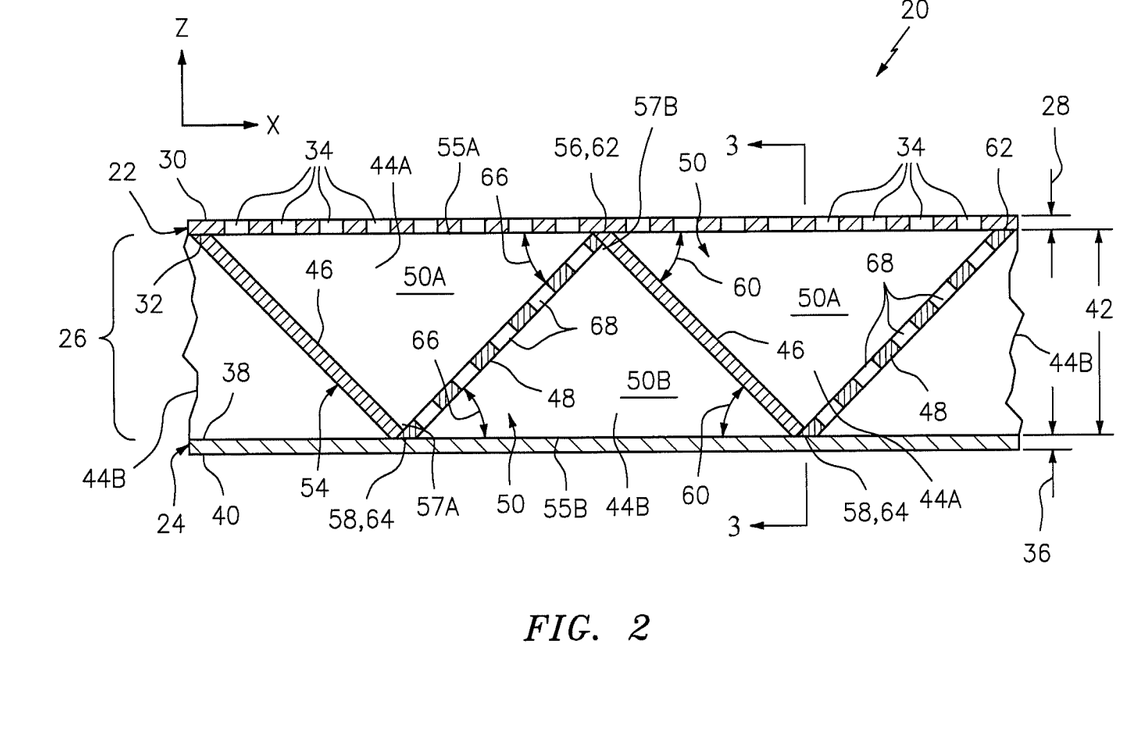
FIG. 2 is a sectional illustration of a portion of the structural panel.

The first skin 22 may be configured as a relatively thin sheet or layer of material that extends laterally and longitudinally along the x-y plane. This first skin material may include, but is not limited to, a metal, a polymer (e.g., thermoplastic or thermoset), a fiber reinforced matrix (e.g., fiberglass composite, carbon fiber composite, aramid fiber composite, etc.), or a combination thereof. Referring now to FIG. 2, the first skin 22 has a vertical thickness 28, which extends vertically between opposing side surfaces 30 and 32. The first skin 22 includes a plurality of perforations 34; e.g., apertures such as through-holes. Each of these perforations 34 extends generally vertically through the first skin 22 between its side surfaces 30 and 32.

The second skin 24 may be configured as a relatively thin sheet or layer of (e.g., continuous and uninterrupted) material that extends laterally and longitudinally along the x-y plane (see FIG. 1). This second skin material may include, but is not limited to, a metal, a polymer (e.g., thermoplastic or thermoset), a fiber reinforced composite (e.g., fiberglass composite, carbon fiber composite, aramid fiber composite, etc.), or a combination thereof. The second skin material may be the same as or different than the first skin material. The second skin 24 has a vertical thickness 36, which extends vertically between opposing side surfaces 38 and 40. This vertical thickness 36 may be substantially equal to or different (e.g., greater or less) than the vertical thickness 28 of the first skin 22.

The core structure 26 extends laterally and longitudinally along the x-y plane (see FIG. 1). The core structure 26 has a vertical thickness 42, which extends vertically between opposing core sides, which are abutted against the first skin 22 and the second skin 24. This vertical thickness 42 may be substantially greater than the vertical thickness 28 of first skin 22 and/or the vertical thickness 36 of the second skin 24. The vertical thickness 42, for example, may be at least ten to forty times (10-40×), or more, greater than the vertical thickness 28, 36; however, the structural panel 20 of the present disclosure is not limited to such an exemplary embodiment.

Figure 3:
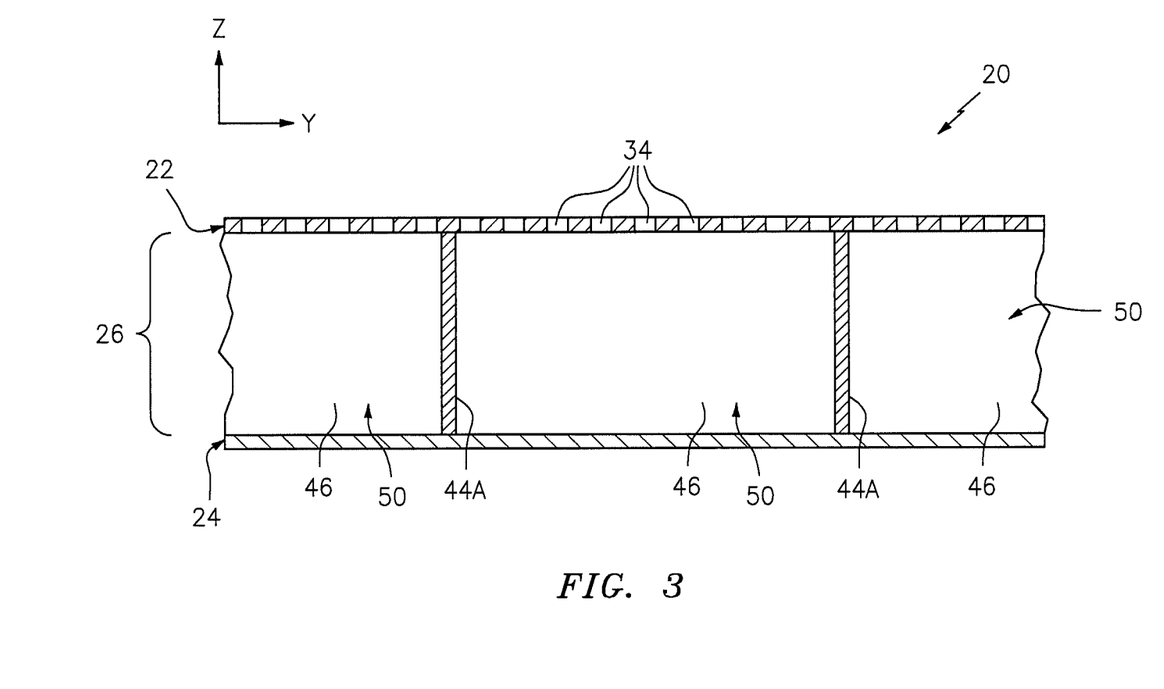
FIG. 3 is a sectional illustration of the structural panel taken along the line 3-3 of FIG. 2.
Figure 4:
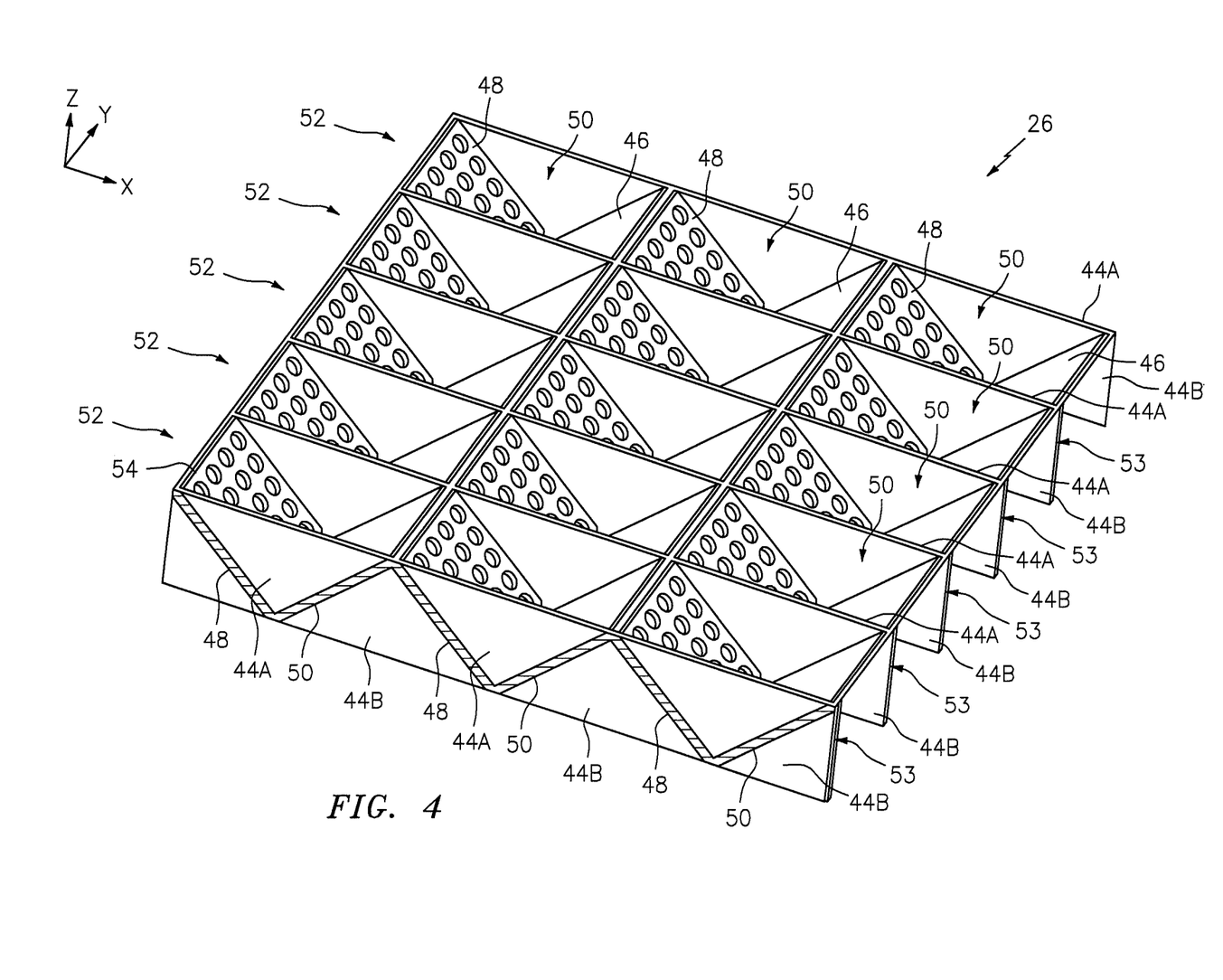
FIG. 4 is a perspective illustration of a portion of a cellular core structure.

Referring to FIGS. 2-4, the core structure 26 includes a plurality of non-porous walls 44A and 44B (generally referred to as "44"), a plurality of non-porous baffles 46 and a plurality of porous septums 48, where the baffles 46 and the septums 48 form a corrugated ribbon 54. The components 44, 46 and 48 are arranged together to configure the core structure 26 as an open cavity (e.g., open cell) structure. This open cavity structure forms a plurality of cavities 50 (see also FIG. 6) vertically between the first skin 22 and the second skin 24. These cavities 50 may be arranged in a plurality of linear arrays 52 (see FIG. 4), where each array 52 extends longitudinally along the x-axis and parallel to the non-porous walls 44. Each of the cavities 50 may be fluidly coupled with one or more respective perforations 34 in the first skin 22 (see FIGS. 2 and 3).

Each of the walls 44A, 44B may be configured as a thin triangular body as shown in FIGS. 2 and 4. Referring to FIG. 2, a base 55A of each wall 44A is disposed at the first skin 22 and a tip 57A of each wall 44A is disposed at the second skin 24. A base 55B of each wall 44B is disposed at the second skin 24 and a tip 57B of each wall 44BA is disposed at the first skin 22.

Referring to FIG. 4, the walls 44A, 44B are arranged in a plurality of linear arrays 53. Each of the wall arrays 53 shown in FIG. 4 includes one or more of the walls 44A and one or more of the walls 44B. The wall arrays 53 may be arranged generally parallel with one another. The wall arrays 53 are laterally spaced from one another so as to respectively form the cavities 50 laterally between laterally adjacent walls 44; see also FIG. 3. With this configuration, laterally adjacent cavities 50 (e.g., cavities 50 in laterally adjacent arrays 52) are also fluidly separated from one another by a respective one of the walls 44.

Referring to FIG. 2, each of the walls 44A extends vertically between the first skin 22 and the corrugated ribbon 54. Each of the walls 44A of FIG. 2 is also connected to the corrugated ribbon 54 and the first skin 22. Each of the walls 44B extends vertically between the second skin 24 and the corrugated ribbon 54. Each of the walls 44B of FIG. 2 is also connected to the corrugated ribbon 54 and the second skin 24. Each of the walls 44 is orientated substantially perpendicular to the first skin 22 and the second skin 24. However, in other embodiments, one or more of the walls 44 may be offset from the first skin 22 and/or the second skin 24 by a non-ninety degree angle; e.g., an acute included angle.

Figure 5:
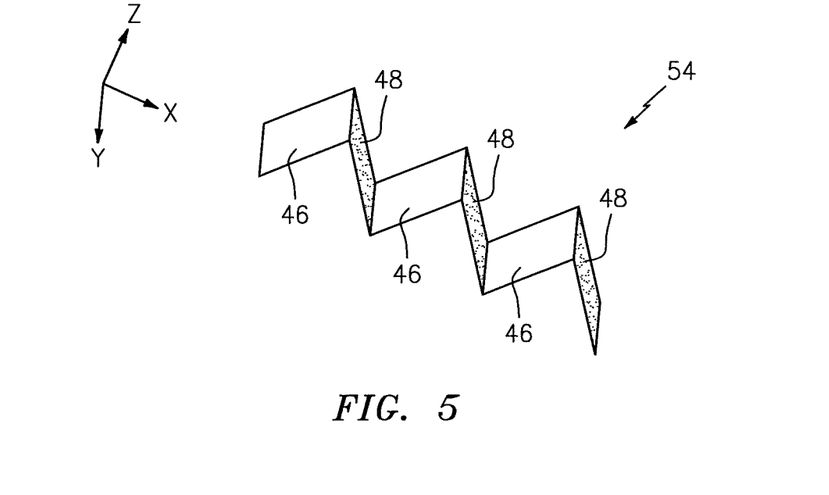
FIG. 5 is a perspective illustration of a portion of a corrugated ribbon.

As described above, the baffles 46 and the septums 48 are arranged together to provide the corrugated ribbon 54. An exemplary embodiment of such a corrugated ribbon is shown in FIG. 5. This corrugated ribbon 54 may be configured as a (e.g., monolithic) corrugated body, which body is continuous vertically between the first skin 22 and the second skin 24 (see FIG. 2) as well as continuous extending longitudinally along one or more of the cavities 50 (see FIG. 4).

The baffles 46 are interdisposed with the respective septums 48. More particularly, each of the baffles 46 (unless configured at a longitudinal end of the ribbon 54) is disposed and may extend longitudinally between a respective adjacent pair of the septums 48. Similarly, each of the septums 48 (unless configured at a longitudinal end of the ribbon 54) is disposed and may extend longitudinally between a respective adjacent pair of the baffles 46.

Referring to FIG. 2, one end 56 of each of the baffles 46 is vertically engaged with and/or connected to the first skin 22. An opposing end 58 of each of the baffles 46 is vertically engaged with and/or connected to the second skin 24. Thus, each of the baffles 46 may be angularly offset from the first skin 22 and the second skin 24 by an angle 60; e.g., an acute angle or other (e.g., ninety degree) angle. Similarly, one end 62 of each of the septums 48 is vertically engaged with and/or connected to the first skin 22. An opposing end 64 of each of the septums 48 is vertically engaged with and/or connected to the second skin 24. Thus, each of the septums 48 may be angularly offset from the first skin 22 and the second skin 24 by an angle 66; e.g., an acute angle or other (e.g., ninety degree) angle. In this manner, the corrugated ribbon 54 has a corrugated configuration (see FIG. 5), where one of the baffles 46 and one of the septums 48 may form a single corrugation. Of course, in other embodiments, one or more of the corrugations may each include at least one additional element; e.g., a bridge.

Figure 6:
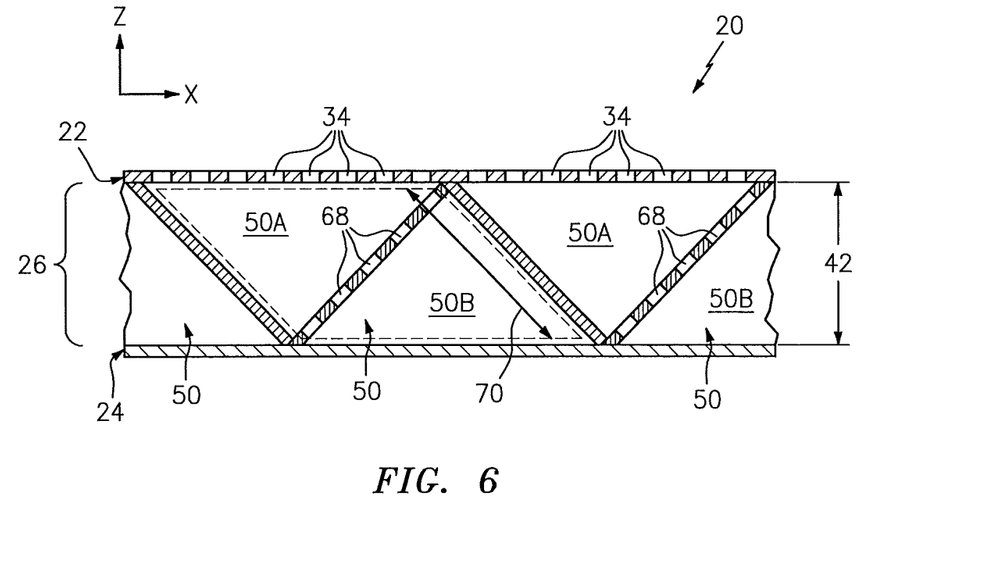
FIG. 6 is another sectional illustration of the structural panel portion of FIG. 2.

Referring to FIG. 6, each of the cavities 50 extends longitudinally between and is formed by an adjacent pair of the baffles 46. Each septum 48 is disposed within and divides a respective one of the cavities 50 into fluidly coupled sub-cavities 50A and 50B. One or more perforations 68 in the septum 48 fluidly coupled the sub-cavities 50A and 50B together.

With the foregoing core configuration, each of the cavities 50 forms a resonance chamber. A length 70 of the resonance chamber extends diagonally between the first skin 22 and the second skin 24 and through a respective one of the septums 48. The effective acoustic length 70 of the resonance chamber therefore is longer than the vertical thickness 42 of the core structure 26. This enables noise attenuation of relatively low frequency noise without increasing the vertical thickness of the structural panel 20. For example, each resonance chamber may receive noise waves through the perforations 34 in the first skin 22. The resonance chamber may reverse the phase of one or more frequencies of those sound waves using known acoustic resonance and noise cancellation principles and subsequently direct the reverse phase sound waves out of the structural panel 20 through the perforations 34 to destructively interfere with other incoming noise waves.

Figure 7:
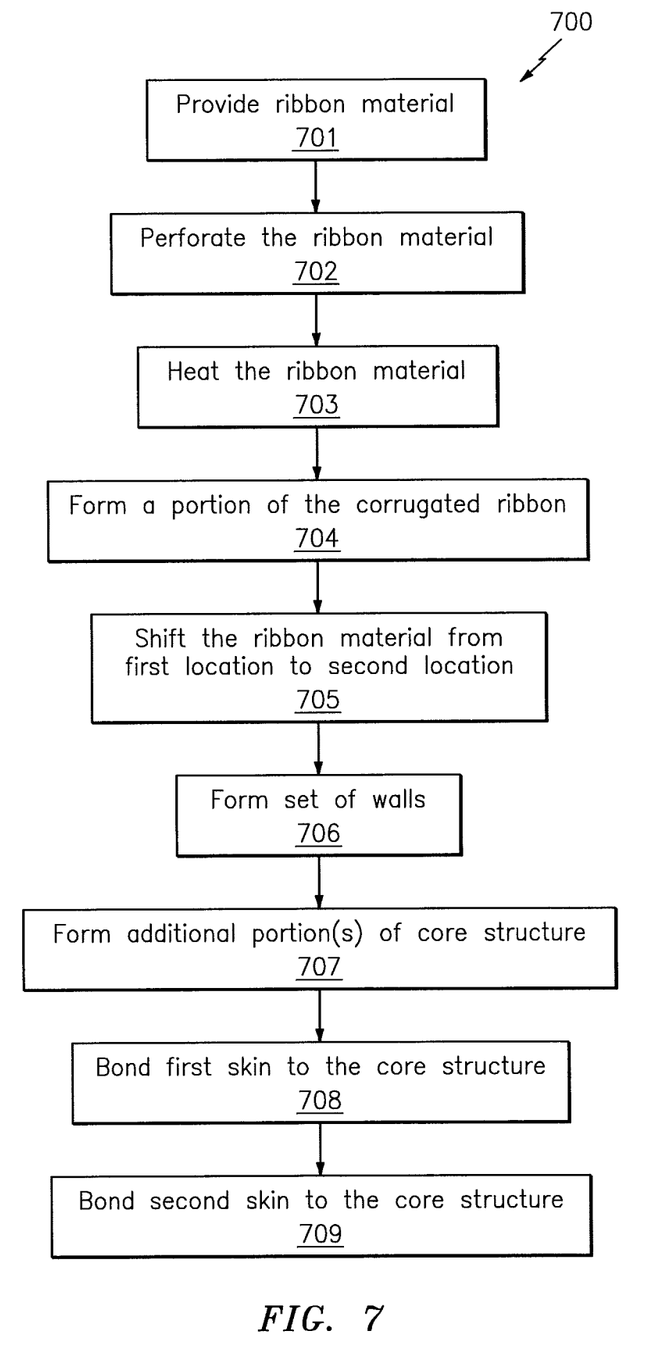
FIG. 7 is a flow diagram of a method for forming a structural panel.
Figure 8:
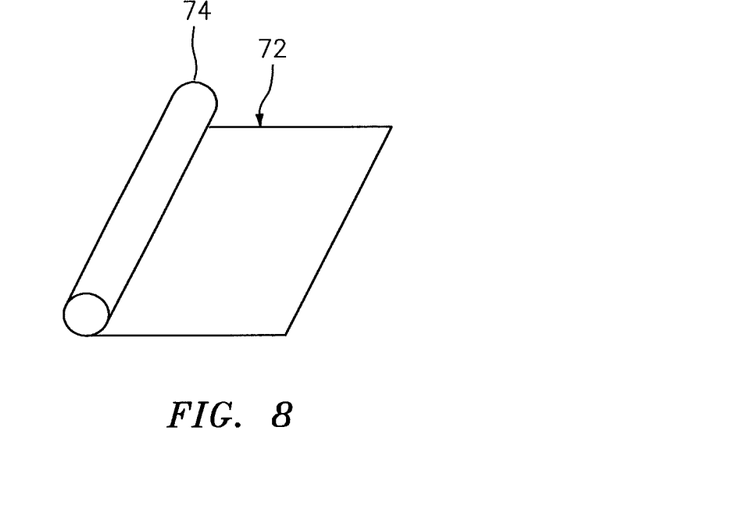
FIG. 8 is a perspective illustration of a partially unrolled roll of ribbon material.

FIG. 7 is a flow diagram of a method 700 for forming a structural panel such as the structural panel 20 described above and illustrated in FIGS. 1-4. In step 701, ribbon material 72 is provided. The ribbon material 72 shown in FIG. 8 is in the form of a substantially flat sheet of the ribbon material 72. This sheet of the ribbon material 72 may be at least partially rolled up into a roll 74 as shown in FIG. 8. The ribbon material 72 may be or include a polymer such as thermoplastic material. The ribbon material 72 may also include long strand and/or short strand (e.g., chopped) fiber reinforcement embedded within the polymer. Examples of fiber reinforcement include, but are not limited to, fiberglass, carbon fiber and aramid fiber. The present disclosure, however, is not limited to the foregoing exemplary ribbon materials.

Figure 9:
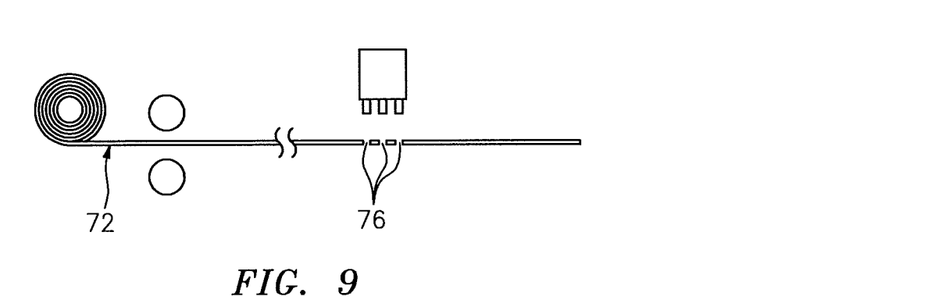
FIG. 9 is a schematic illustration of a process step for forming perforations in the ribbon material.

In step 702, a plurality of perforations 76 are formed in discrete regions of a first portion of the sheet of the ribbon material 72 as shown, for example, in FIG. 9. These perforations 76 will become the perforations 68 in the septums 48, and the perforated regions will become the septums 48. The perforations 76 may be formed via punching, drilling (e.g., with a bit or water jet), or using any other suitable technique. Of course, in alternative embodiments, the perforations 76 may be formed (e.g., punch, drilled, etc.) after formation of an associated portion of the corrugated ribbon but before formation of the associated walls, or still alternatively after formation of the associated walls 44. In still other embodiments, the perforations 76 may be formed during a process for shaping the sheet of the ribbon material 72. It is worth noting, while present, the perforation 76 are not shown in FIGS. 10-13 and 16 for ease of illustration.

Figure 10:
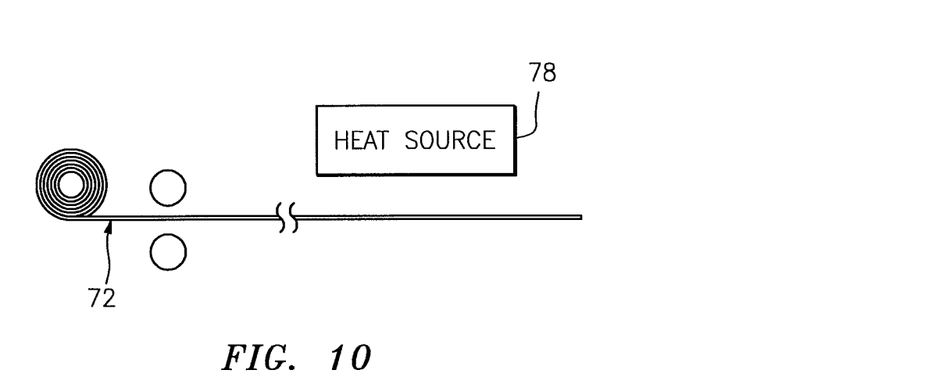
FIG. 10 is a schematic illustration of a process step for heating the ribbon material.

In step 703, the first portion of the sheet of the ribbon material 72 is heated by a thermal source 78 (e.g., a heating device) as shown, for example, in FIG. 10.

Figure 11:
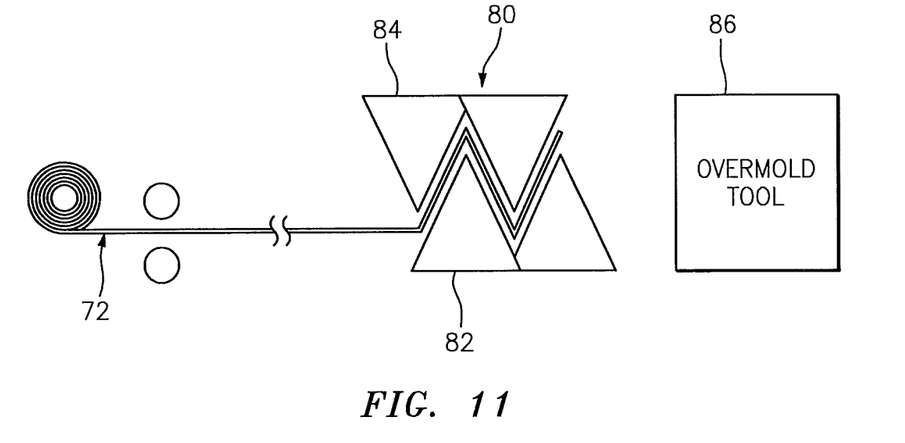
FIGS. 11 and 12 are schematic illustrations of a process step for corrugating the ribbon material.
Figure 12:
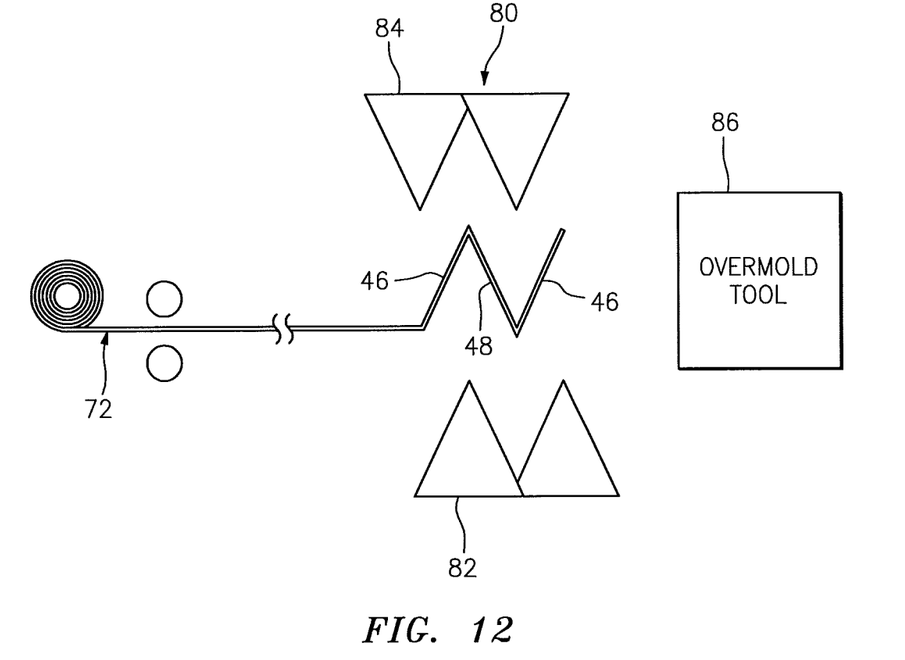

In step 704, a first portion of the corrugated ribbon 54 is formed as shown, for example, in FIG. 11. For example, the first portion of the sheet of the ribbon material 72 is positioned with a ribbon stamping tool 80. The ribbon stamping tool 80 of FIG. 9 includes a first (e.g., bottom) die 82 and a second (e.g., top) die 84. When the first die 82 and the second die 84 come together as shown in FIG. 9, the first portion of the sheet of the ribbon material 72 is shaped to provide one or more corrugations and, thus, one or more of the baffles 46 and one or more of the septums 48. The first die 82 and the second die 84 may then be separated from one another to reveal the first portion of the corrugated ribbon as shown in FIG. 12.

In some embodiments, the ribbon stamping tool 80 may be replaced with a ribbon folding tool. In such embodiments, the first portion of the sheet of the ribbon material 72 may be disposed with the ribbon folding tool during the step 704, and the ribbon folding tool may shape the ribbon material 72 to form the first portion of the corrugated ribbon 54.

Figure 13:
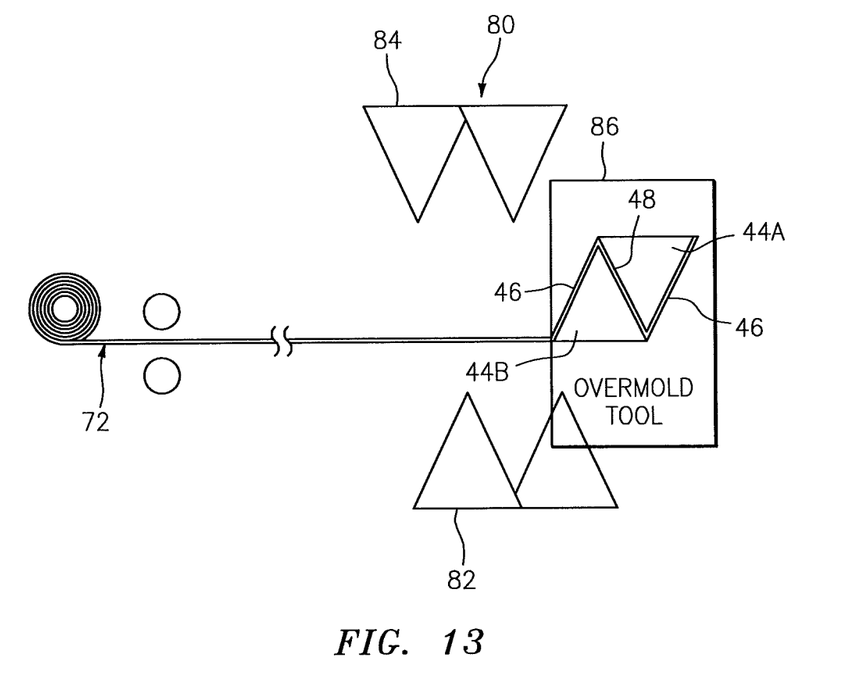
FIG. 13 is a schematic illustration of a process step for forming walls with the corrugated ribbon material.

In step 705, the first portion of the sheet of the ribbon material 72 is shifted from the ribbon stamping tool 80 location to an overmolding tool location as shown, for example, in FIG. 13.

Figure 14:
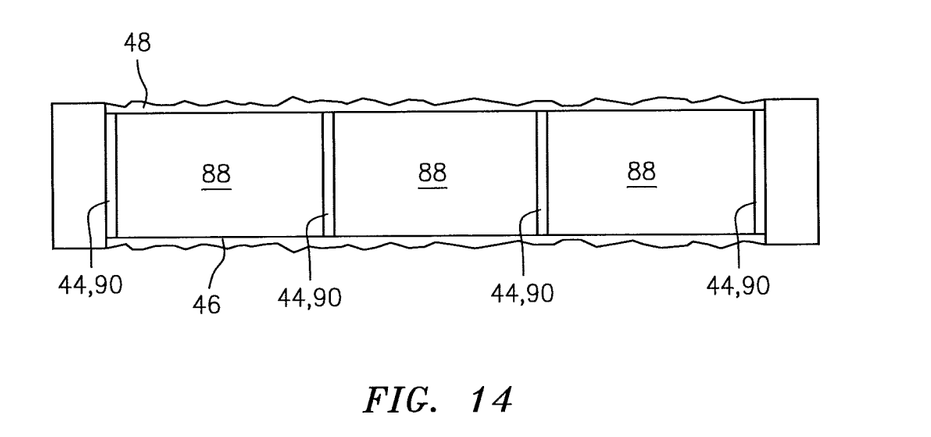
FIG. 14 is an illustration of molds with a portion of corrugated ribbon material for forming the walls.

In step 706, a first set of the walls 44 is formed as shown, for example, in FIG. 13. For example, an overmolding tool 86 is configured with the first portion of the corrugated ribbon 54. The overmolding tool 86 is operated to overmold thermoplastic material onto the ribbon material 72 to form the first set of the walls 44. For example, referring to FIG. 14, a plurality of negative space molds 88 may be arranged in each channel between adjacent elements 46 and 48. Fluid thermoplastic material may then be injected into spaces 90 between the molds 88 and form the walls 44 upon cooling and solidifying. In the embodiment of FIG. 13, the walls 44A are formed in a top channel between a respective one of the baffles 46 and a respective one of the septums 48. The walls 44B are formed in a bottom channel between a respective one of the baffles 46 and a respective one of the septums 48. A first portion of the core structure 26 is thereby formed.

In the exemplary method 700 shown in FIG. 7, the wall formation step 706 is performed after the step 704 and before the step 707. However, in other embodiments, the steps 706 and 704 may be performed substantially concurrently (and the step 705 may be omitted) using a system as shown, for example, in FIG. 16. In still other embodiments, one or more or each portion of the corrugated ribbon 54 may be formed before forming the walls 44. In such embodiments, each set of walls 44 may be formed iteratively (one-after-another), or all the walls 44 (or multiple sets of the walls 44) may be formed in a single operation.

Referring again to the exemplary method 700 of FIG. 7, in step 707, a second portion of the core structure 26 is formed. This second portion of the core structure 26 is longitudinally adjacent the previously formed first portion formed by the steps 702-706. The second portion of the core structure 26 may be formed by repeating the steps 702-706 with a second portion of the sheet of the ribbon material 72. The step 707 may then be repeated one or more additional times to form one or more additional (e.g., third, fourth, etc.) portions of the core structure 26 until the entire core structure 26 is iteratively formed.

In step 708, the first skin 22 is bonded to the core structure 26; e.g., see FIG. 6.

In step 709, the second skin 24 is bonded to the core structure 26; e.g., see FIG. 6. The steps 708 and 709 may be performed sequentially (e.g., either 708 and then 709, or 709 and then 708). Alternatively, the steps 708 and 709 may be performed substantially simultaneously.

In some embodiments, the first skin 22 may be perforated before being bonded to the core structure 26. In other embodiments, the first skin 22 may be perforated after being bonded to the core structure 26.

Figure 15:
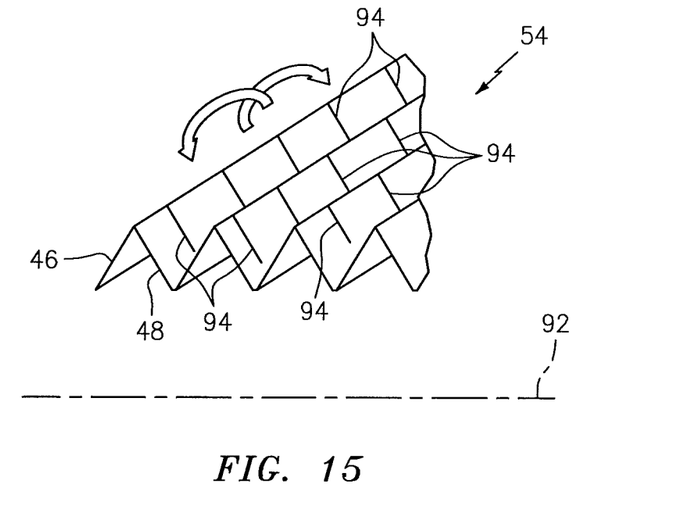
FIG. 15 is a perspective illustration of a portion of another corrugated ribbon with slits.

As discussed above, the structural panel 20 may have a complex curvature; e.g., curved along both the x-axis and y-axis. To facilitate the provision of this curvature, at least a portion of or the entire corrugated ribbon 54 may be shaped (e.g., via thermoforming) to follow a curved contour before the wall forming step 706, between the steps 706 and 708 and/or 709, or after the steps 708 and 709. To facilitate the bending of the core structure 26 about a longitudinally extending axis 92, the corrugated ribbon 54 may be configured with one or more slits 94 (e.g., thin linear through slots) in one or more of the baffles 46 and/or one or more of the septums 48 as shown, for example, in FIG. 15.

In some embodiments, the shaping of each portion of the sheet of the ribbon material 72 may be substantially the same. For example, the same shaping dies (e.g., 82, 84) may be used for each portion of the sheet of the ribbon material 72. However, in other embodiments, the shaping of at least one portion of the sheet of the ribbon material 72 may be different from the shaping of another portion of the sheet of the ribbon material 72. For example, one set of shaping dies may be used to shape a first portion of the sheet of the ribbon material 72 and another set of shaping dies may be used to shape a second portion of the sheet of the ribbon material 72. In this manner, the angles 60, 66 in FIG. 2 between the components 46 and 48 may be altered. In addition or alternatively, the dimensions (e.g., lengths) of the components 46 and 48 may be altered.

Figure 16:
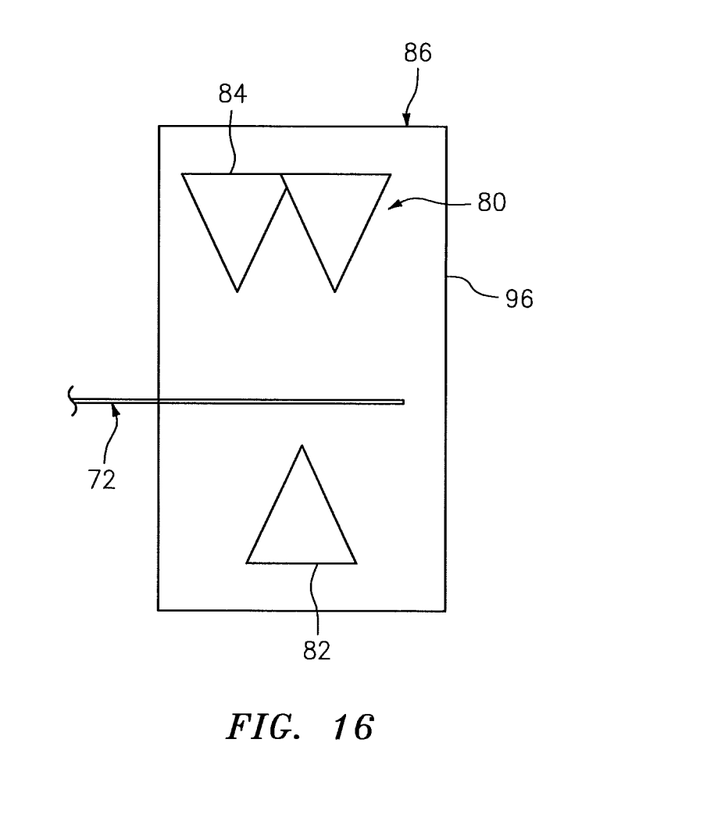
FIG. 16 is a schematic illustration of the ribbon material with a shaping tool and an overmolding tool at a common location.

In some embodiments, the shaping tool (e.g., the ribbon stamping tool 80 or the ribbon folding tool) and the overmolding tool 86 may be configured at a common location as shown in FIG. 16. For example, the shaping tool may be configured within a housing 96 of the overmolding tool 86. In such embodiments, a respective portion of the corrugated ribbon 54 and associated walls 44 may be formed without moving the ribbon material 72 to another location.

The foregoing formation techniques may be easily adapted for automation.

The foregoing formation techniques may be used to form panels 20 with geometries and configurations other than that described above. For example, while the angles 60 and 66 are shown in FIG. 2 as being approximately 45 degrees, in other embodiments those angles may be more or less than 45 degrees; e.g., 60 degrees. In another example, while the angles 60 and 66 are shown as being approximately equal to one another in FIG. 2, in other embodiments the angles 60 and 66 may have different values. For example, the angle 60 may be an acute angle whereas the angle 66 may be approximately 90 degrees.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A method for forming a structural panel, the method comprising:
   forming a core structure including a corrugated ribbon, a plurality of walls and a plurality of cavities, the corrugated ribbon including a plurality of baffles and a plurality of septums, each of the cavities extending laterally between a respective adjacent pair of the walls, each of the cavities extending longitudinally between a respective adjacent pair of the baffles, and each of the cavities longitudinally divided into a pair of sub-cavities by a respective one of the septums;
   the forming of the core structure comprising
      shaping a first portion of a sheet of ribbon material to form a first of the baffles and a first of the septums; and
      overmolding thermoplastic material onto the ribbon material, between the first of the baffles and the first of the septums, to form a first set of the walls.

2. The method of claim 1, wherein the forming of the core structure further comprises
   shaping a second portion of the sheet of the ribbon material to form a second of the baffles and a second of the septums after the forming of the first set of the walls; and
   overmolding thermoplastic material onto the ribbon material, between the second of the baffles and the second of the septums, to form a second set of the walls.

3. The method of claim 1, wherein the forming of the core structure further comprises
   forming a second of the baffles; and
   overmolding thermoplastic material onto the ribbon material, between the second of the baffles and the first of the septums, to form a second set of the walls.

4. The method of claim 1, wherein the forming of the core structure further comprises
   shaping a second portion of the sheet of the ribbon material to form a second of the baffles and a second of the septums before the forming of the first set of the walls; and
   overmolding thermoplastic material onto the ribbon material, between the second of the baffles and the second of the septums, to form a second set of the walls.

5. The method of claim 1, wherein the shaping of the first portion of the sheet of the ribbon of material comprises stamping the first portion of the sheet of the ribbon material to form the first of the baffles and the first of the septums.

6. The method of claim 1, wherein the shaping of the first portion of the sheet of the ribbon of material comprises folding the first portion of the sheet of the ribbon material to form the first of the baffles and the first of the septums.

7. The method of claim 1, wherein the ribbon material comprises thermoplastic material.

8. The method of claim 1, further comprising forming one or more perforations in the first portion of the sheet of the ribbon material before the shaping, wherein the one or more perforations are configured in the first of the septums.

9. The method of claim 1, further comprising forming one or more perforations in the first of the septums after the shaping and before the overmolding.

10. The method of claim 1, further comprising forming one or more perforations in the first of the septums after the overmolding.

11. The method of claim 1, wherein the shaping is performed at a first location and the overmolding is performed at a second location.

12. The method of claim 1, wherein the shaping and the overmolding is performed at a common location.

13. The method of claim 1, wherein the forming of the core structure further comprises forming one or more slits in the ribbon material, and the one or more slits are operable to enable flexibility of the core structure about a longitudinally extending axis.

14. The method of claim 1, wherein a curvature of the core structure is at least partially provided during the shaping.

15. The method of claim 1, wherein a curvature of the core structure is provided after the overmolding.

16. The method of claim 1, wherein
   the forming of the core structure further comprises shaping a second portion of the sheet of the ribbon material to form a second of the baffles and a second of the septums; and
   the shaping of the second portion is different from the shaping of the first portion.

17. The method of claim 1, further comprising:
   bonding the core structure to a first skin; and
   bonding the core structure to a second skin;
   each of the cavities extending vertically between the first skin and the second skin;
   wherein each of the septums is configured with one or more perforations, and the first skin is configured with a plurality of perforations.

18. The method of claim 17, wherein
   each of the baffles and each of the septums extends vertically between and is connected to the first skin and the second skin; and
   each of the septums extends longitudinally between and is connected to a respective adjacent pair of the baffles.

19. A method for forming a structural panel that includes a first skin, a second skin and a core structure, the core structure including a plurality of baffles, a plurality of septums, a plurality of walls and a plurality of cavities, each of the cavities extending laterally between a respective adjacent pair of the walls, each of the cavities extending longitudinally between a respective adjacent pair of the baffles, each of the cavities extending vertically from the first skin to the second skin, and each of the cavities longitudinally divided into a pair of sub-cavities by a respective one of the septums, the method comprising:

providing a substantially flat sheet of ribbon material;

shaping a portion of the sheet of the ribbon material at a first location to form a respective one of the baffles and a respective one of the septums;

shifting the portion of the sheet of the ribbon material from the first location to a second location;

overmolding thermoplastic material onto the ribbon material to form a respective set of the walls in a channel defined between the respective one of the baffles and the respective one of the septums;

repeating the shaping, the shifting and the overmolding one or more times for one or more other portions of the sheet of the ribbon material to at least partially form the core structure;

attaching the first skin to the core structure; and attaching the second skin to the core structure.

20. The method of claim 19, wherein the shaping comprises at least one of folding or stamping the portion of the sheet of the ribbon material to form the first of the baffles and the first of the septums.

\* \* \* \* \*